United States Patent
Dreher et al.

(10) Patent No.: US 12,104,668 B2
(45) Date of Patent: Oct. 1, 2024

(54) DISC BRAKE LINING, ASSEMBLED DEPENDING ON THE DIRECTION OF ROTATION, FOR A FIXED CALIPER DISC BRAKE

(71) Applicant: Continental Teves AG & Co. oHG, Frankfurt am Main (DE)

(72) Inventors: Herbert Dreher, Frankfurt am Main (DE); Dietrich Golz, Frankfurt am Main (DE); Frederic Zimnoch, Frankfurt am Main (DE)

(73) Assignee: Continental Teves AG & Co . oHG, Frankfurt am Main (DE)

( * ) Notice: Subject to any disclaimer, the term of this patent is extended or adjusted under 35 U.S.C. 154(b) by 0 days.

(21) Appl. No.: 17/051,991

(22) PCT Filed: May 9, 2019

(86) PCT No.: PCT/EP2019/061974
§ 371 (c)(1),
(2) Date: Oct. 30, 2020

(87) PCT Pub. No.: WO2019/215299
PCT Pub. Date: Nov. 14, 2019

(65) Prior Publication Data
US 2021/0231182 A1    Jul. 29, 2021

(30) Foreign Application Priority Data

May 9, 2018    (DE) ...................... 10 2018 207 269.8

(51) Int. Cl.
*F16D 65/095* (2006.01)
*F16D 55/00* (2006.01)
(Continued)

(52) U.S. Cl.
CPC ......... *F16D 65/095* (2013.01); *F16D 55/227* (2013.01); *F16D 2055/0016* (2013.01);
(Continued)

(58) Field of Classification Search
CPC ...... F16D 65/095; F16D 65/18; F16D 55/227; F16D 65/092; F16D 55/228;
(Continued)

(56) References Cited

U.S. PATENT DOCUMENTS 3,285,371 A    11/1966  Cadiou
3,391,761 A     7/1968  Brueder
(Continued)

FOREIGN PATENT DOCUMENTS

CN    1133082 A    10/1996
CN    1946950 A     4/2007
(Continued)

OTHER PUBLICATIONS

International Search Report and Written Opinion for International Application No. PCT/EP2019/061974, mailed Jun. 24, 2019, with partial translation, 8 pages.
(Continued)

*Primary Examiner* — Pamela Rodriguez
(74) *Attorney, Agent, or Firm* — Buchanan Ingersoll & Rooney PC

(57) ABSTRACT

A disc brake lining is assembled depending on the rotation direction and includes a backing plate to carry a friction material, having diametrically opposed sides configured to be free from friction material. The backing plate is formed asymmetrically with respect to a central axis, and has a bearing on the inlet side relative to a preferred direction of rotation and provided radially inwardly in relation to a central wheel rotational axis, radially offset below a brake piston axis, as a holder with a hole for receiving a retaining
(Continued)

pin, defining a fixedly positioned friction lining fixed bearing. A guide is on an allocated outlet-side bearing of the backing plate, radially outwardly in relation to the central wheel rotational axis, radially offset above a brake piston axis. The guide is an open-edged mouth opening with a receiving pocket receiving a guide pin, and defines a fixedly allocated friction lining floating bearing.

22 Claims, 5 Drawing Sheets

(51) Int. Cl.
    *F16D 55/227* (2006.01)
    *F16D 65/02* (2006.01)
    *F16D 65/18* (2006.01)
(52) U.S. Cl.
    CPC .. *F16D 2055/007* (2013.01); *F16D 2065/026* (2013.01); *F16D 65/18* (2013.01)
(58) Field of Classification Search
    CPC ......... F16D 2055/007; F16D 2065/026; F16D 2121/04; F16D 2055/0016; B60T 1/065
    See application file for complete search history.

(56) References Cited

U.S. PATENT DOCUMENTS

| | | | | |
|---|---|---|---|---|
| 4,350,229 | A | * | 9/1982 | Ito .................... F16D 55/227 188/73.32 |
| 4,467,898 | A | | 8/1984 | Courbot et al. |
| 4,560,037 | A | * | 12/1985 | Gumkowski ......... F16D 55/227 188/73.38 |
| 5,020,643 | A | | 6/1991 | Redenbarger |
| 6,340,076 | B1 | | 1/2002 | Tsuchiya |
| 7,731,002 | B2 | | 6/2010 | Haupt et al. |
| 8,028,810 | B2 | | 10/2011 | Bach et al. |
| 8,967,338 | B2 | | 3/2015 | Wakabayashi et al. |
| 9,441,685 | B2 | | 9/2016 | Iraschko |
| 9,920,799 | B2 | | 3/2018 | Maehara et al. |
| 10,670,093 | B2 | | 6/2020 | Dreher et al. |
| 10,690,202 | B2 | | 6/2020 | Crippa et al. |
| 2007/0240946 | A1 | | 10/2007 | Schorn et al. |
| 2011/0127126 | A1 | | 6/2011 | Ciotti et al. |
| 2015/0122597 | A1 | | 5/2015 | Shimamura et al. |
| 2018/0195569 | A1 | * | 7/2018 | Dreher .................... B60T 1/065 |
| 2021/0231182 | A1 | | 7/2021 | Dreher et al. |

FOREIGN PATENT DOCUMENTS

| | | |
|---|---|---|
| CN | 101427044 A | 5/2009 |
| CN | 101580057 A | 11/2009 |
| CN | 103307149 A | 9/2013 |
| CN | 103384776 A | 11/2013 |
| CN | 103797264 A | 5/2014 |
| CN | 104755786 A | 7/2015 |
| CN | 107269739 A | 10/2017 |
| CN | 107850147 A | 3/2018 |
| DE | 1210633 B | 2/1966 |
| DE | 19626296 A1 | 1/1998 |
| DE | 102014223649 A1 | 5/2016 |
| DE | 102016209069 A1 | 3/2017 |
| DE | 10 2017 205 415 A1 | 10/2017 |
| EP | 2318729 B1 | 5/2011 |
| EP | 2746612 81 | 6/2014 |
| EP | 3791085 B1 | 3/2022 |
| GB | 1029825 A | 5/1966 |
| JP | 58163833 A | 9/1983 |
| JP | 2010185500 A | 8/2010 |
| JP | 2012117656 A | 6/2012 |
| KR | 10-2018-0021128 A | 2/2018 |
| WO | 9800648 A1 | 1/1998 |
| WO | 2005064188 A1 | 7/2005 |
| WO | 2010010583 A1 | 1/2010 |
| WO | 2019215299 A1 | 11/2019 |

OTHER PUBLICATIONS

German Search Report for German Application No. 10 2019 206 736.0, dated Mar. 29, 2020, with partial translation, 9 pages.
Chinese Office Action for Chinese Application No. 201980030980.0, dated Sep. 28, 2021, with translation, 14 pages.
Japanese Notice of Reasons for Refusal for Japanese Application No. 2020-562657, dated Dec. 20, 2021, with translation, 14 pages.
Canadian Examination Report for Canadian Application No. 3,099,200, dated Apr. 13, 2022, 4 pages.
Chinese Notification of Allowance for Chinese Application No. 201980030980.0, dated Jul. 6, 2022, 4 pages.
Korean Notice to Submit Response for Korean Application No. 10-2020-7035333, dated Jun. 27, 2022 with translation, 13 pages.
Canadian Examination Report for Canadian Application No. 3,099,200, dated Nov. 10, 2022, 4 pages.
Wiki-Fase downloaded at https://web.archive.org/web/20170908023531/ https://de.wikipedia.org/wiki/Fase with translation, 2017, 4 pages.
Wiki-Langloch, downloaded at https://web.archive.org/web/20151023075024/https://de.wikipedia.org/wiki/Langloch with translation, 2015, 4 pages.
Widmaier, "Lueger: Lexicon of the Entire Technology and Its Auxiliary, Sciences, 2nd Edition" with translation, 1908, vol. 6, 7 pages.
European Opposition for EP Application No. 19724399.1, dated Dec. 6, 2022 with translation, 67 pages.
Korean Notice of Decision for Rejection for Korean Application No. 10-2020-7035333, dated Jan. 12, 2023 with translation, 7 pages.
Office Action issued Apr. 22, 2024, by the Mexico Patent Office in corresponding Mexican Patent Application No. MX/a/2020/011545 and an English machine translation of the Office Action. (6 pages).

* cited by examiner

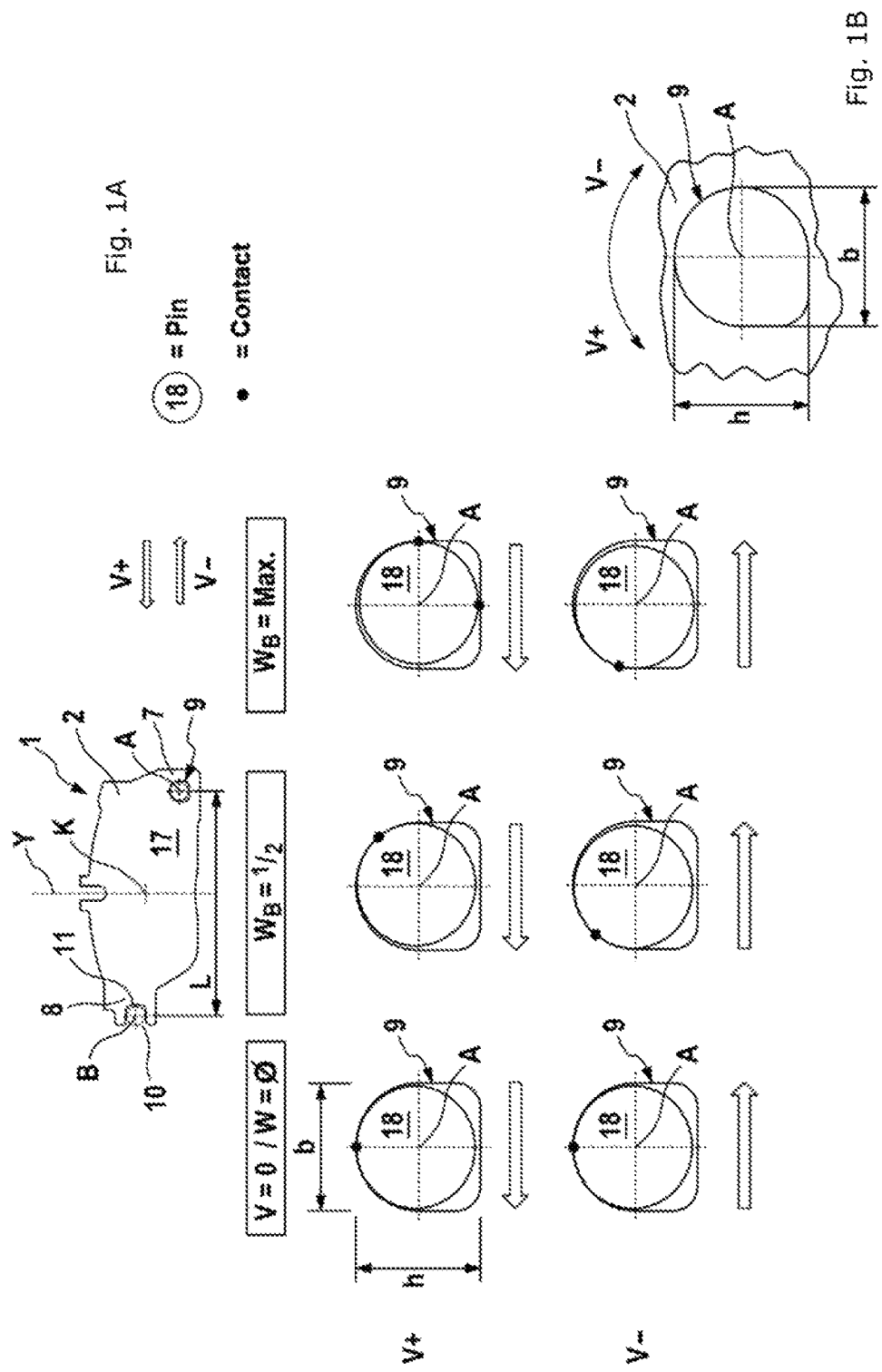

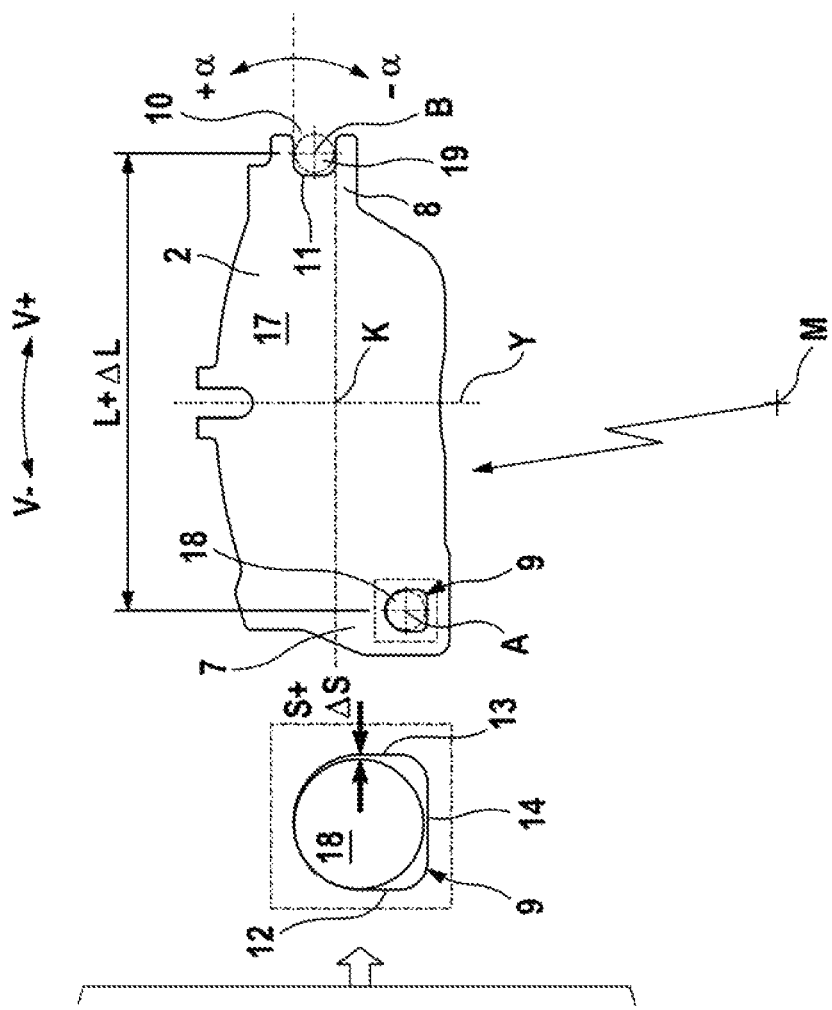

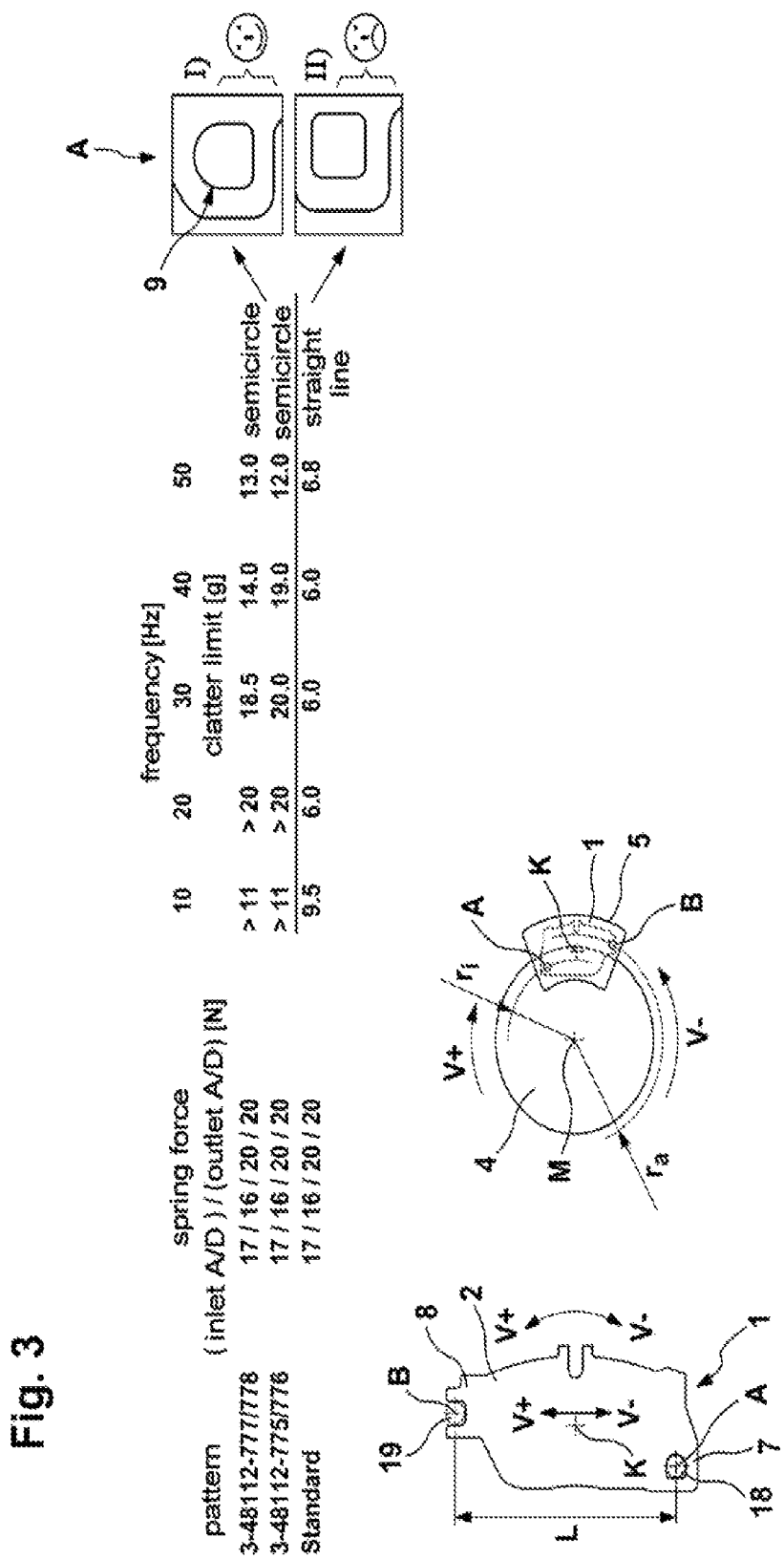

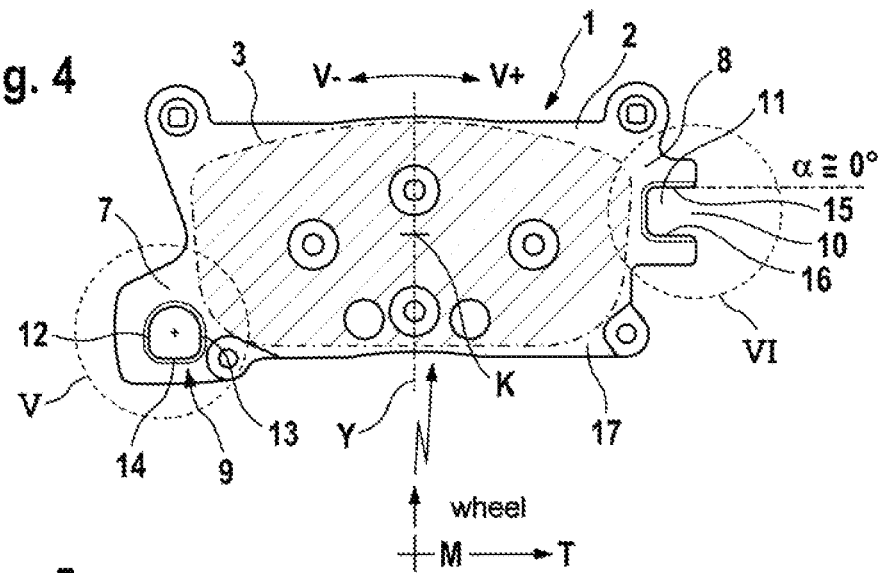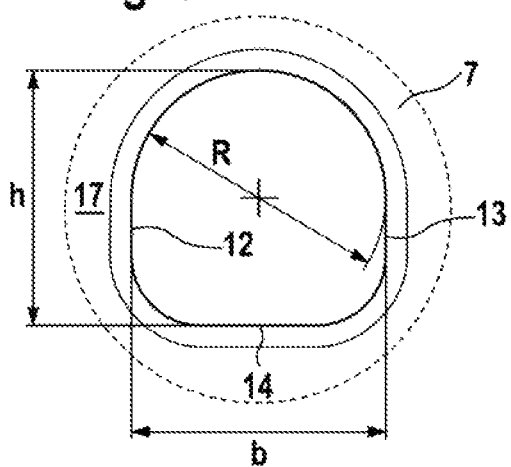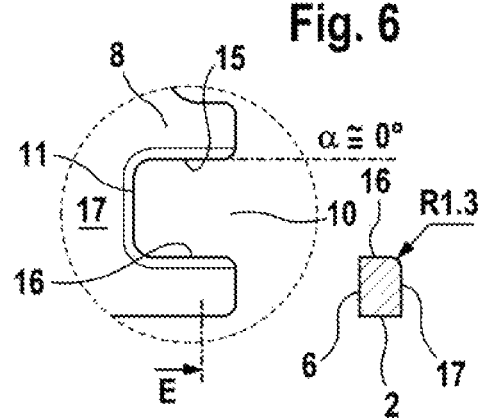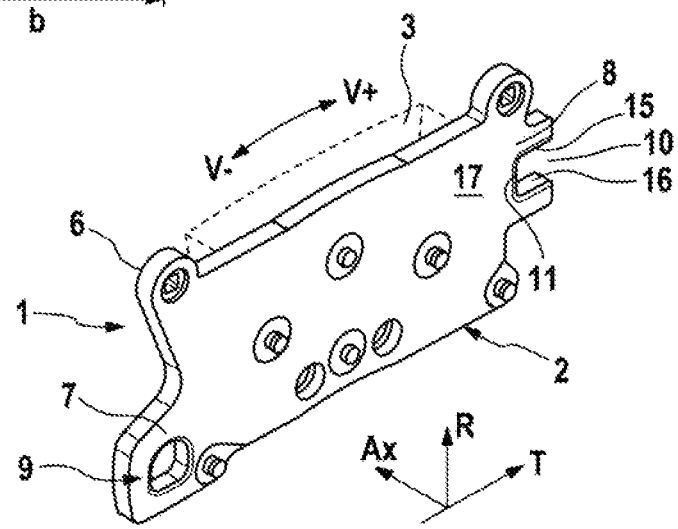

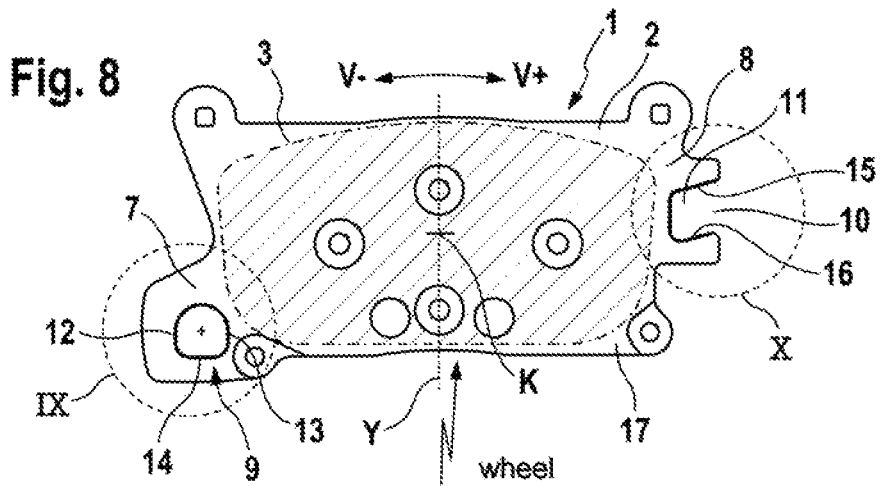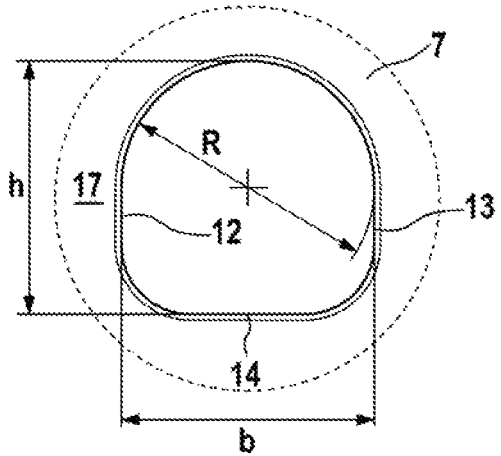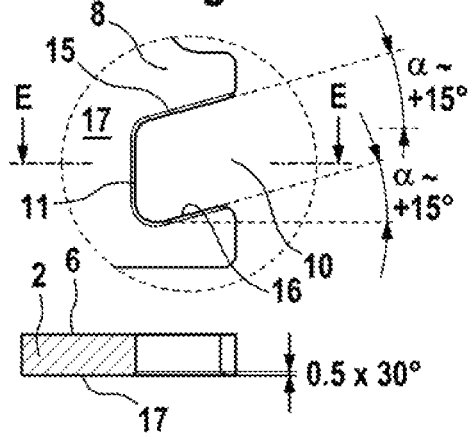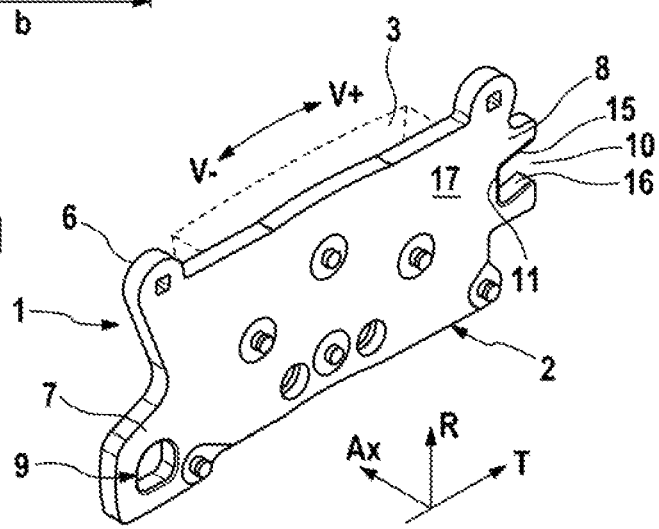

DISC BRAKE LINING, ASSEMBLED DEPENDING ON THE DIRECTION OF ROTATION, FOR A FIXED CALIPER DISC BRAKE

CROSS REFERENCE TO RELATED APPLICATIONS

This application is the U.S. National Phase application of PCT International Application No. PCT/EP2019/061974, filed May 9, 2019, which claims priority to German Patent Application No. 10 2018 207 269.8, filed May 9, 2018, the contents of such applications being incorporated by reference herein.

FIELD OF THE INVENTION

The invention concerns a disc brake lining assembled depending on the direction of rotation and asymmetrically improved, in backing plate configuration, for a fixed caliper part-lining disc brake for a motor vehicle, and a preferred paired use of said disc brake linings in a fixed caliper disc brake system of correspondingly adapted design, wherein for the purpose of holding the friction linings rotationally fixedly and guiding the friction linings with parallel moveability, the fixed caliper brake housing of correspondingly adapted design receives two pins which are oriented parallel to each other and to a wheel rotational axis, wherein said pins cooperate appropriately with said friction lining backing plate for the purpose of supporting forces or moments and/or for guidance according to the degree of spatial freedom.

BACKGROUND OF THE INVENTION

WO 2005/064188 A1, incorporated herein by reference, describes a high-performance fixed caliper brake which in principle can be loaded equally highly for forward travel and for reverse travel. The friction lining is assembled symmetrically relative to a friction lining central axis and formed with an Ω-shaped structure. In relation to the friction lining central axis, the fixed caliper brake housing contains a quasi-redundant, symmetrically designed friction lining mounting+friction lining pin guidance by means of two identically designed pin bearings. The two pin bearings are positioned at uniform identical level in the radial direction, and arranged radially below a theoretical point of attack of the friction force, said point aligning approximately with a radially oriented height level of a brake piston axis. The force flow of a retaining force introduction into the fixed caliper brake housing, i.e. the transmission of brake circumferential force, is achieved via the bore wall of the perforated backing plate at the respective pin arranged on the inlet side. The tilt moment or torque support is provided via both pins. On braking following a change in wheel rotation direction, there is therefore always a change of contact point in relation to the introduction of the brake circumferential forces, so there is no fixed bearing. Alternately, the respective other pin provides a rotational block so that the friction lining is not pivoted out of engagement. This friction lining mounting and guidance always comprises two eyelets/receiving openings which are arranged mirror-symmetrically in a brake lining backing plate. These friction lining mountings are set such that circumferential forces are always borne on the inlet-side pin, with the result that the load change in the force flow is connected with a pin change-over. Noise-free load change behaviour requires a correspondingly high precision, and hence dimensionally strict tolerance, with respect to the friction lining mounting and guidance by the two pin bearings; in particular, precision with respect to the components involved in the force flow, such as in particular pins inserted with precise fit, and eyelets as pin-receiving holes in the respective backing plate. One consequence of this fine mechanical setting is a corresponding cost load. However, the wheel brake market in principle prefers symmetrically formed brake lining backing plate configurations, because these in principle are aesthetically pleasing, can facilitate brake maintenance processes, and also allow rational use of the strip metal with less waste.

SUMMARY OF THE INVENTION

An aspect of the present invention is accordingly primarily a novel proposal of an improved friction lining mounting for a fixed caliper part-lining disc brake for a motor vehicle, which avoids problems such as NVH and clattering noise on a change of rotational direction, avoids high component costs and avoids cost-intensive housing machining. An aspect of the present invention in principle turns away from a fully symmetrically assembled mainstream product, assembled independently of direction of rotation, in that a bearing is proposed which omits redundancies independent of rotational direction, and in simplified summary defines a novel and asymmetrically supported friction lining holder and friction lining guide which contains a backing plate assembly that is selectively bonded depending on the direction of rotation. Accordingly, an aspect of the invention is based on the principle of a fixedly defined fixed bearing A, in conjunction with a particularly practical requirement collective which rests on the basic assumption that the greatest braking power WB is always required in the forward direction, which is the preferred direction of rotation V+, whereas a reverse direction of rotation V− causes a reduced braking energy input WB in the practical load collective. An aspect of the invention furthermore contains a novel friction lining configuration, such as in particular the use of paired friction linings as a spare parts kit compiled for retail use. In parallel, a proposal is made which concerns the correspondingly novel configuration of a fixed caliper disc brake system as the suitably adapted, modified receiving component for the friction lining components, wherein a brake system assembly according to an aspect of the invention is claimed and documented together with the disclosure of an aspect of the present invention.

According to an aspect of the invention, a disc brake lining 1, which is assembled depending on the direction of rotation, comprises a backing plate 2 as a carrier for a friction material 3, for the purpose of cooperation with a rotatable brake disc 4 that is surrounded by a fixed caliper disc brake housing fixed to the vehicle, and wherein the backing plate 2 is cut from a strip-like flat sheet steel material so as to be asymmetric with respect to a friction lining central axis Y, the friction material 3 being fixed largely centrally and indirectly or directly onto a front side 6 of the backing plate 2, and is formed with diametrically opposed bearing flanks 7, 8 designed so as to be free from friction material, and wherein the backing plate 2 is formed asymmetrically in relation to the friction material central axis Y. The backing plate 2, on its bearing flank 7 placed on the inlet side with respect to the preferred rotational direction V+, has a fixed brake force holder placed offset radially below the brake piston axis K, with a hole 9 which serves for receiving the retaining pin. Accordingly, firstly a stationary, fixedly positioned friction lining fixed bearing A is defined.

According to an aspect of the invention, thus no position change or pin change is defined for retaining force transmission, even when the load direction changes due to a change in rotational direction/vehicle travel direction. On the outlet side, a bearing flank 8 is allocated on the backing plate 2 and arranged with its guide means/torque support/twist prevention means transversely offset radially outwardly with respect to the piston axis K. This guide is formed by an open-edged mouth opening 10 with receiving pocket 11 for receiving the guide pin. By this measure, on the outlet side (with respect to the preferred rotational direction V+), a fixedly allocated friction lining floating bearing B is defined. Because the holding and guidance functionality is fixedly distributed on respective sides according to an aspect of the invention, an aspect of the present invention for the first time allows a surprisingly simple component production+dimensional tolerance. Furthermore, there is no disadvantageous change or interruption in force flow because of retaining force support with changing rotational direction. In other words, an aspect of the present invention defines a static, fixedly positioned fixed bearing and floating bearing configuration without interruption of force flow.

BRIEF DESCRIPTION OF THE DRAWINGS

Both the functional correlations and the structural details of quite particularly preferred variants or preferred embodiments of the present invention arise from the detailed description below given with reference to the drawing. In this context, the individual figures of the drawing, which are partially illustrative or schematic, on different scale and either enlarged or reduced, and in different perspectives or extracts, in some cases in generalised chart form, illustrate:

FIG. 1A outline sketches to clarify a fixedly assembled mounting, via the fixed bearing A, using a retaining pin contact point • which is designed to move autonomously in a fixedly assigned hole 9 of a backing plate 2, for various, different alternating brake operating conditions, on the example of a preferred embodiment of a fixed caliper friction lining 1, assembled depending on rotational direction, according to an aspect of the invention;

FIG. 1B an alternative fixed bearing variant comprising a three-quarter-circular arcuate, partially circular hole variant;

FIG. 2 an outline sketch showing the form, position and dimensional tolerance situation on the example of a preferred embodiment of a fixed caliper friction lining 1, received depending on rotational direction, according to an aspect of the invention, with fixedly allocated fixed bearing A comprising a retaining pin 18 of circular cross-section and a partially circular hole/eyelet 9 of semicircular arcuate form, present offset radially below a piston longitudinal axis K, and with a floating bearing B for a guide pin 19 of circular cross-section which is offset largely radially above the piston axis K;

FIG. 3 a principle illustration with comparison of various measurement results for noise events in connection with a basic system/test bench construction and responsible friction lining design variation, wherein a previously known standard mounting is compared with a preferred design of a partially circular fixed bearing according to an aspect of the invention;

FIG. 4 a backing plate rear view of a first preferred friction lining variant in reduced scale, with pitch angle α of approximately 0° in the region of the mouth opening 10;

FIG. 5 detail V from FIG. 4 but enlarged, with semicircular arcuate partially circular hole/eyelet/window 9 for receiving a retaining pin 18 of circular cross-section in a friction lining backing plate 2, for the fixed bearing A;

FIG. 6 detail VI from FIG. 4 but enlarged, with an open-edged cutout receiving pocket 11 for receiving a guide pin 19, for the floating bearing B, and with edge radius R 1.3 on the rear (see section E on right-hand side edge);

FIG. 7 the friction lining 1 using the first backing plate variant from FIG. 4 but in perspective;

FIG. 8 a backing plate rear view of a second preferred friction lining variant in reduced scale, with pitch angle α of approximately 15° in the region of the mouth opening 10;

FIG. 9 detail IX from FIG. 8 but enlarged, with semicircular arcuate partially circular hole/eyelet/window 9 for receiving a retaining pin 18 in a friction lining backing plate 2 as the fixed bearing A;

FIG. 10 detail X from FIG. 8 but enlarged, with an open-edged cutout receiving pocket 11 for receiving a guide pin 19, for the floating bearing B, and with chamfer 0.5×30° on the rear (see partial section E-E at the bottom of FIG. 10); and FIG. 11 a friction lining 1 using the second preferred backing plate variant from FIG. 4 but in perspective.

DETAILED DESCRIPTION OF THE PREFERRED EMBODIMENTS

An aspect of the invention is explained below with the primary focus on some possible friction lining design variants, although all appropriate and included components or parts of the brake are included in the scope of protection of an aspect of the invention.

The focus lies primarily on the fundamentally new, asymmetrically cutout friction lining backing plate geometry. A backing plate 2 for this has a fixedly allocated fixed bearing A which is cut out as a closed-edge passage opening or hole or eyelet 9 in the form of a partially circular window with defined height h and defined width b. The hole 9 is adapted for suitable contact on the retaining pin 18 with gradually smaller circular cross-section, in that at the top, an arc is positioned which is diametrically opposite (mainly vertically at the top in the sketches) a theoretical wheel rotational axis M/brake disc rotational axis.

In a further specified design, this arcuate structure—namely the hole 9 in the sense of a slot—may also be distorted or composed of several single arc segments and several graduated pieces. An assembled structure of differently formed geometric parts or curve segments is also conceivable. However, the figures also illustrate a slot-like elongate hole structure, the height h of which is slightly larger than the width b, wherein the height h is measured parallel to the friction lining central axis Y. The result is a retaining pin 18 of circular cross-section, oriented orthogonally to its direction of retaining force flow, i.e. which can be received transversely with slight play in its hole receiver. This advantageously achieves, for example, that interposed wear or corrosion products or dirt can be dissipated automatically because of the mutual relative displacement in this self-cleaning operational design.

The preferred partially circular window substantially has a semicircular arc which, with a predefined nominal radius, spans two window reveals 12, 13 oriented substantially parallel to each other such that the arc transforms steplessly into the associated window reveals 12, 13. The double nominal radius has an at least slightly generous tolerance, so that a retaining pin 18 of circular cross-section can be received and easily mounted in the hole 9 with transitional fit or slight play. In a lower part of the hole 9, the two window reveals 12, 13 are connected together by a substantially flat window base 14. The window base 14 and semicircular arc are provided substantially opposite each other. Each window base 14 is oriented substantially orthogonally, transversely i.e. perpendicularly to the window reveals 12, 13. It is possible that a quarter-circular arc with a defined circle radius is interposed between the window base 14 and each window reveal 12, 13, so that a corner is avoided, or a retaining pin with circular cross-section can favourably closely follow the hole structure. The circle radii involved may have different dimensions. Preferably, the circle radius of the quarter-circular arc is dimensioned substantially smaller than half the retaining pin diameter. Seizing or corrosion damage is advantageously avoided by the different radii. In a further preferred variant of this preferred embodiment, the two quarter-circular arcs are formed with different radii and oriented opposite each other. This allows a particularly performance-focused, suitable mutual adaptation in the load-bearing behaviour (surface pressure reduction) between the paired curved contact faces. In the further performance-focused specification, according to an aspect of the invention it is also proposed that an inlet-side allocated quarter-circular arc has a larger radius than an outlet-side allocated quarter-circular arc. As a definition of a lower limit dimension, it is recommended that the radii of the quarter-circular arcs are each in themselves dimensioned smaller than the radius of the semicircular arc. However, as a definition of an upper limit dimension, the radii of the two quarter-circular arcs added together correspond approximately to the radius of the spanning semicircular arc.

For example, a radius of a quarter-circular arc is dimensioned approximately 20% to 80% smaller than the radius of the semicircular arc.

The description below provides more details of the design of the floating bearing B in the region of the bearing flank 8. In principle, a comparatively simple rotation inhibition/moment block using the backing plate 2 may be sufficient. A preferred structural design here comprises a mouth opening 10 open at the edges, with receiving pocket 11 and mouth faces 15, 16 oriented substantially parallel to each other, and with an undercut on the base side as clearance for the guide pin 19. The undercut in this context ensures that the force flow via the guide pin 19 is free from tangentially oriented retaining forces. In other words, the guide pin 19 transfers exclusively transverse forces.

Thus it is ensured that the guide pin 19 is excluded from any retaining task, and serves exclusively to ensure that the friction lining 1 cannot twist uncontrollably.

For integral protection against lifting, it is suitable if the mouth faces 15, 16 of the mouth opening 10 are oriented fully or, at least in the portion of the guide pin receiver, largely parallel to each other and transversely offset with a pitch angle $\alpha$ of between around 0°-±45°. Tests have shown that a pitch angle $\alpha=+15°$ can achieve particularly favourable results.

With a view to an improved protection against injury, it may furthermore be defined that the peripheral cutout edges of the backing plate 2, either all around or selectively, are formed preferably mechanically finished, ground down, broken, with a defined chamfer or rounded, either already on the backing plate punched blank or at least on the friction lining finished part. In particular, a partially circular window or mouth opening 10 on the back side 17 of the backing plate 2 is in each case provided with a defined form, either via a peripheral semicircular rounded edge with radius R or alternatively by a defined chamfered edge of at least 0.5× 30°, or optionally by various mixed forms of these variants so as to ensure injury-free mounting.

An aspect of the invention finally defines a fixed caliper disc brake lining 1 assembled depending on direction of rotation, with a particularly shortened tolerance chain which is defined exclusively by addition or subtraction of two nominal dimensions, including their upper and lower deviations, in the range of the dimensions directly involved in the A fixed bearing on the fixed mounting side, namely between a) retaining pin diameter D (including its respective deviation tolerances $\Delta$D) and b) pin-receiving opening d in the backing plate 2 (including its respective deviation tolerances $\Delta$d), according to the formula $$\Delta d \pm d + \Delta D \pm D = \Delta S \pm S.$$

Here, the tolerance chain is shortened according to an aspect of the invention by the unilaterally fixedly allocated fixed bearing between the backing plate 2 and the retaining pin 18, wherein the given pin spacing L between the retaining pin 18 and guide pin 19 has no influence on the introduction of force flow of retaining forces into the fixed caliper housing 5.

In a further advantageous embodiment of the invention, to avoid confusion, it may be defined that the hole 9 and the mouth opening 10 have optionally different or identically dimensioned diameters, wherein the assigned retaining pin 18 and guide pin 19 themselves have optionally adapted, i.e. identically or differently dimensioned diameters, so that only a correct mutual mounting pairing is possible. For example, on the basis of the laws of form fit or mutually adapted fit shapes, it can be automatically excluded by design that the guide pin 19 is erroneously paired with the hole 9, or it can also be avoided that the retaining pin 19 is erroneously combined with the mouth opening 10.

In top view, the measures for holding and guidance are arranged on the backing plate 2 such that they are diametrically spaced laterally from each other and placed radially offset in relation to a piston axis K. This arrangement may be implemented so that a maximum radial offset is present between the different support points.

An aspect of the invention furthermore concerns a fixed caliper disc brake with a brake caliper housing 5 for rotationally fixed mounting of at least two piston-actuated disc brake linings 1, which are mounted so as to be guided movably parallel to and relative to each other in the actuation direction and are arranged on both sides of mutually parallel friction surfaces of a rotating brake disc 4, in that the introduction of braking force into the brake caliper housing 5 is defined stationarily by the fixed bearing A, and a floating bearing B is provided which is positioned stationarily thereto, wherein also at least one friction lining 1 is present which can fulfil any feature combination according to one or more of the arrangements described in detail above.

According to an aspect of the invention, it is quite particularly suitable to provide a disc brake lining spare parts kit, loosely bundled as an assembly kit, ready assembled in an outer packing, containing as a part component two disc brake linings 1, assembled depending on direction of rotation and designed substantially mirror symmetrically to each other, which fulfil at least one of the above features or alternatively or in combination any arbitrary combination thereof, and wherein this assembly set is suitable and intended to serve for new production, restoration and/or maintenance, in particular repair, of a fixed caliper part-lining disc brake for a motor vehicle as described above.

In the solution proposed here for this task, the backing plate 2 constitutes a novel, central and separately preassembled component of a disc brake lining 1. The backing plate 2 is here cut from a strip-like flat sheet steel material and provided with allocated bearing and guidance via pins 18, 19 arranged asymmetrically with respect to a central axis Y. The friction lining backing plate 2 is cut out asymmetrically with respect to its central axis Y, in particular fine cut or laser cut, and serves as a carrier for a bonded friction material mixture 3 which has been applied largely symmetrically relative to the central axis and fixed largely centrally and indirectly or directly to the front side 6. The backing plate 2 also has diametrically opposite offset bearing flanks 7, 8 which are free from friction material and may form protrusions arranged asymmetrically relative to each other. Further details will become apparent from the description with reference to the drawing.

According to an aspect of the invention, the invention allows advantageous concentration on a fixed bearing A, in that it provides that a pin-receiving opening, for forming a fixed bearing A in the lining carrier (backing plate) for the brake force-transmitting retaining pin, has an arcuate, in particular semicircular contour in the upper region. As a special form, a design with a semicircular contour or with a free-form contour is in principle possible.

The play situation and tolerance calculation between backing plate and retaining pin is shortened according to an aspect of the invention, because this is influenced exclusively by the dimensions defined on the fixed bearing side at the fixed bearing A between a) retaining pin diameter (including respective tolerance) and b) pin retaining opening in the brake lining carrier (including respective tolerance). Thus a rougher tolerance is possible in the distance/spacing of length L between the retaining pin and guide pin. In other words, a tolerance in spacing L between the fixed bearing A and floating bearing B is possible without particular effect on the NVH results (squealing noise). Accordingly, a rougher tolerance in length L allows a very advantageous effect on production costs (cost reduction). Thermally induced dimensional changes also have no functionally adverse effect. According to an aspect of the invention, as a solution formula in principle for the design of the friction lining mounting, the following shortened tolerance chain is defined:

$$\Delta d \pm d + \Delta D \pm D = \Delta S \pm S.$$

In a refinement of an aspect of the invention, at the pin receiver of the fixed bearing A, it may be provided that at an arcuate or alternatively semi-elliptical contour defined above, in addition a curvature is machined in the right lower quadrant of the retaining pin receiver, between 3 o'clock and 6 o'clock. The resulting "close following" allows a gradual guided transition with gradual change of force direction, and thereby contributes to avoiding an abrupt change in respective contact point following changed conditions. Radial play can thus be designed simply reduced.

A play situation between the backing plate 2 and the lining guiding pin 19 is, according to an aspect of the invention, influenced solely by the diameter tolerance calculation with respect to the A bearing (fixed bearing). In particular, a distance L between the retaining pin 18 and guide pin 19 (i.e. the distance between the fixed bearing A and floating bearing B) is irrelevant for the tolerance calculation. According to an aspect of the invention, thermally induced dimensional changes also have no influence. Favourable advantages of an aspect of the invention arise because a play situation, which is reduced to avoid NVH and clatter noise, can be achieved at lower cost because of the wider tolerances, reduced dimensional precision of components, or rougher machining of the housing. After a change in rotational direction, the new contour allows a clear and directly adapted contact situation at the fixed bearing A between a single lining retaining pin and the assigned pin receiver in the opening of the lining carrier at the respective individually characterized contact point (depending on plate loading) for forward and reverse travel, with more economic dimensional precision. There is no multipoint contact in the load range relevant for noise development. Continuous transition of the contact point on rising or falling brake load and change of direction of travel. This continuous transition also improves the clatter noise behaviour on poor road surfaces.

Accordingly, a statically determined and simultaneously comfort-oriented bearing arrangement between the disc brake lining 1 and the part-lining disc brake for a motor vehicle is indicated by means of a backing plate 2 according to an aspect of the invention in a manner which is particularly simple and economical and also allows extremely advantageous inward-pivot mounting.

Incorrect assembly or confusion is excluded by coding integrated into the design in accordance with the poka yoke principle. For example, in one embodiment the hole 11 and the mouth opening 13 have differently or identically dimensioned diameters, wherein associated retaining pins 21 and guide pins 22, for their part, have matching and identically or differently dimensioned diameters.

LIST OF REFERENCE SIGNS

WB Braking energy
V+ Forward rotational direction (preferred rotational direction)
V− Reverse rotational direction
A Fixed bearing
B Floating bearing
L Distance
ΔL Distance tolerance
D Retaining pin diameter
ΔD Retaining pin diameter tolerance
d Retaining pin receiver
Δd Retaining pin receiver tolerance
R Nominal radius
R X/r Radius
S Tolerance
ΔS Tolerance deviation
Rad Radial direction
Ax Axial direction
T Tangential direction
K Piston axis
M Wheel/(brake disc) rotational axis
Y Friction lining central axis
• Contact point
α Pitch angle [θ]
h Height
b Width
1 (Motor vehicle) disc brake lining
2 Backing plate
3 Friction material
4 Brake disc
5 Fixed caliper disc brake housing
6 Front side
7 Bearing flank
8 Bearing flank
9 Hole/eyelet
10 Open-edged mouth opening 11 Receiving pocket
12 Window reveal
13 Window reveal
14 Window base/threshold
15 Mouth face
16 Mouth face
17 Back side
18 Carrier or retaining pin
19 Torque support or guide pin

The invention claimed is:

1. A disc brake lining which is assembled depending on the direction of rotation, with a backing plate as a carrier for a friction material, for the purpose of cooperation with a rotatable brake disc that is surrounded by a rotationally fixedly mounted fixed caliper disc brake housing, and for mounting the disc brake lining; wherein the backing plate is cut from a strip-like flat sheet steel material so as to be asymmetric with respect to a friction lining central axis (Y); the friction material is fixed largely centrally and indirectly or directly on a front side of the backing plate; with distal bearing flanks arranged transversely offset and designed to be free from friction material, wherein the bearing flank placed on the inlet side in the preferred direction of rotation is transversely offset radially inwardly in relation to a piston axis (K), and has a holder with a hole for receiving a retaining pin in order to define a fixedly positioned friction lining fixed bearing (A); and the allocated bearing flank of the backing plate which is radially outwardly transversely offset is equipped with twist prevention device in the form of a mouth opening which is designed open at the edges and has a receiving pocket as a guide pin receiver so as to define a fixedly positioned friction lining floating bearing (B),
wherein the hole is formed as a partially circular window with defined maximum height (h) and defined maximum width (b), the maximum height (h) of the partially circular window being at least slightly larger than the maximum width (b), and
wherein the hole is sized to enable an automatic self cleaning function of the disc brake lining due to movement of the retaining pin within the hole relative to the disc brake lining.

2. The disc brake lining which is assembled depending on the direction of rotation as claimed in claim 1, wherein the partially circular window substantially has a semicircular arc which, with a predefined nominal radius (R), spans two window reveals having edges oriented substantially parallel to each other and parallel to the friction lining central axis (Y), and wherein the two window reveals are connected together by a window base which is substantially flat and orthogonal to the friction lining central axis (Y).

3. The disc brake lining which is assembled depending on the direction of rotation as claimed in claim 2, wherein the window base and semicircular arc are provided substantially opposite each other.

4. The disc brake lining which is assembled depending on the direction of rotation as claimed in claim 2, wherein the window base is provided substantially orthogonally to the window reveals.

5. The disc brake lining which is assembled depending on the direction of rotation as claimed in claim 2, wherein a quarter-circular arc with a defined radius is interposed between the window base and each window reveal, and wherein a circle radius of the quarter-circular arc is dimensioned substantially smaller than half the retaining pin diameter (D).

6. The disc brake lining which is assembled depending on the direction of rotation as claimed in claim 5, wherein the two quarter-circular arcs are formed with differently dimensioned radii and oriented opposite each other.

7. The disc brake lining which is assembled depending on the direction of rotation as claimed in claim 5, wherein an inlet-side allocated quarter-circular arc has a larger radius than an outlet-side allocated quarter-circular arc.

8. The disc brake lining which is assembled depending on the direction of rotation as claimed in claim 5, wherein radii of the quarter-circular arcs are each in themselves dimensioned smaller than a radius of the semicircular arc.

9. The disc brake lining which is assembled depending on the direction of rotation as claimed in claim 8, wherein the radii of the two quarter-circular arcs added together correspond approximately to the radius of the spanning semicircular arc.

10. The disc brake lining which is assembled depending on the direction of rotation as claimed in claim 5, wherein a radius of one of the quarter-circular arcs is dimensioned around 20%-80% smaller than the radius of the semicircular arc.

11. The disc brake lining which is assembled depending on the direction of rotation as claimed in claim 1, wherein the open-edged mouth opening is defined by two mouth faces which are oriented substantially parallel to each other.

12. The disc brake lining which is assembled depending on the direction of rotation as claimed in claim 11, wherein the mouth faces in the backing plate are formed with a pitch angle α of between around 0°-±45°.

13. The disc brake lining which is assembled depending on the direction of rotation as claimed in claim 12, wherein the pitch angle α of a preferred embodiment is in particular α=0 or α=+15°.

14. The disc brake lining which is assembled depending on the direction of rotation as claimed in claim 1, wherein the hole and/or the mouth opening is/are each formed on a back side of the backing plate with a peripheral semicircular rounded edge of radius (R) of approximately 1 mm, and/or with a broken edge by means of a chamfer of approximately 1×30°.

15. The disc brake lining which is assembled depending on the direction of rotation as claimed in claim 1, wherein a unilaterally fixed friction lining holder in the tangential direction (T), comprising a unilaterally placed retaining pin, with omission of a contact position change, and a unilaterally assigned retaining pin receiver, wherein the resulting tolerance chain (S), including its respective deviation tolerances (ΔS), is defined exclusively by addition or subtraction of two nominal dimensions, including their upper and lower deviations, in the range of the dimensions directly involved in the fixed bearing (A) on the fixed bearing side, namely between a) retaining pin diameter (D), including its respective deviation tolerances (ΔD), and b) pin-receiving opening (d) in the backing plate, including its respective deviation tolerances (Δd), according to the formula $$\Delta d \pm d + \Delta D \pm D = \Delta S \pm S.$$

16. The disc brake lining which is assembled depending on the direction of rotation as claimed in claim 15, wherein the tolerance chain is shortened in that there is no mathematical inclusion of a pin spacing (L).

17. The disc brake lining which is assembled depending on the direction of rotation as claimed in claim 1, wherein a form-fit coding by design is defined in order to avoid the possibility of incorrect mounting of the friction lining, in that the hole and the mouth opening in the backing plate are formed via optionally differently designed or identically dimensioned diameters; and wherein the retaining pin and guide pin themselves have a unique fitting, identically or differently dimensioned diameter; or that quite particularly individually customised, matching receiving openings in the fixed caliper disc brake housing are assigned to the transversely offset bearing flanks of the backing plate, so that these form-fit coding means exclusively ensure a correct mounting pairing.

18. The disc brake lining which is assembled depending on the direction of rotation as claimed in claim 1, wherein the backing plate which has laterally diametrically and distally oriented bearing flanks is arranged transversely offset to each other in the radial direction (R), with two quite differently formed pin-receiving openings.

19. The disc brake lining which is assembled depending on the direction of rotation as claimed in claim 1, wherein the bearing flanks and/or pin-receiving openings are provided on the backing plate so as to be offset to each other by a maximum distance (L).

20. The disc brake lining which is assembled depending on the direction of rotation as claimed in claim 1, wherein the hole is provided which is composed of a three-quarter-circular arc and a quarter-circular arc.

21. A fixed caliper part-lining disc brake for a motor vehicle, comprising the fixed caliper disc brake housing for rotationally fixed mounting and parallel movable guidance of at least two piston-actuated disc brake linings, which are arranged so as to be movable relative to and along the piston axis (K) and are arranged on both sides and parallel to friction surfaces of the rotating brake disc, wherein an introduction of braking force into the fixed caliper disc brake housing defined per fixem fixed bearing (A), in each case stationarily on the inlet side relative to the preferred direction of rotation (V+), and comprising a fixedly positioned friction lining floating bearing (B) which is placed on the outlet side with respect to the preferred direction of rotation (V+), according to the features of claim 1.

22. A disk brake lining spare parts kit comprising at least two disc brake linings which are designed substantially mirror-symmetrically relative to each other and assembled depending on the direction of rotation, with the backing plate as a carrier for the friction material, for the purpose of cooperation with the rotatable brake disc that is surrounded by the rotationally fixedly mounted fixed caliper disc brake housing, and for mounting the disc brake linings; wherein the backing plate is cut from a strip-like flat sheet steel material so as to be asymmetric with respect to a friction lining central axis Y; the friction material is fixed largely centrally and indirectly or directly on a front side of the backing plate; with distal bearing flanks arranged transversely offset and designed to be free from friction material, wherein the bearing flank placed on the inlet side in the preferred direction of rotation is transversely offset radially inwardly in relation to a piston axis K, and has a holder with a hole for receiving a retaining pin in order to define a fixedly positioned friction lining fixed bearing A; and the allocated bearing flank of the backing plate which is radially outwardly transversely offset is equipped with twist prevention device in the form of a mouth opening which is designed open at the edges and has a receiving pocket as a guide pin receiver so as to define a fixedly positioned friction lining floating bearing B, wherein the disk brake lining spare parts kit is usable for new production, restoration, maintenance, or repair, of a fixed caliper part-lining disc brake for a motor vehicle according to the features of claim 21.

* * * * *